United States Patent
Kim et al.

(10) Patent No.: US 9,506,483 B2
(45) Date of Patent: Nov. 29, 2016

(54) FLUID TUBE INCREASING UNIFORMITY OF FLUID FLOW AND APPARATUS INCLUDING THE SAME

(71) Applicant: SAMSUNG ELECTRONICS CO., LTD., Suwon-si, Gyeonggi-do (KR)

(72) Inventors: Jin-ho Kim, Yongin-si (KR); Tae-won Song, Yongin-si (KR); Ji-rae Kim, Seoul (KR); Jeong-sik Ko, Seongnam-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 331 days.

(21) Appl. No.: 14/461,963

(22) Filed: Aug. 18, 2014

(65) Prior Publication Data

US 2015/0064595 A1 Mar. 5, 2015

(30) Foreign Application Priority Data

Aug. 30, 2013 (KR) .................. 10-2013-0104514

(51) Int. Cl.
*H01M 8/04* (2016.01)
*F15D 1/00* (2006.01)
*H01M 8/24* (2016.01)

(52) U.S. Cl.
CPC .......... *F15D 1/001* (2013.01); *H01M 8/04089* (2013.01); *H01M 8/04201* (2013.01); *H01M 8/2485* (2013.01); *Y02E 60/50* (2013.01); *Y10T 137/212* (2015.04); *Y10T 137/2224* (2015.04)

(58) Field of Classification Search
USPC .................................. 429/458, 428
See application file for complete search history.

(56) References Cited

U.S. PATENT DOCUMENTS

| | | |
|---|---|---|
| 3,996,025 A | 12/1976 | Gulden |
| 6,472,090 B1 | 10/2002 | Colbow et al. |
| 6,838,062 B2 | 1/2005 | Goebel et al. |
| 6,924,056 B2 | 8/2005 | Whiton et al. |
| 7,470,405 B2 | 12/2008 | Knopf et al. |

(Continued)

FOREIGN PATENT DOCUMENTS

| | | |
|---|---|---|
| JP | 2555515 B2 | 9/1996 |
| JP | 3113340 B2 | 9/2000 |

(Continued)

OTHER PUBLICATIONS

A. Jiao et al., Experimental investigation of header configuration on flow maldistribution in plate-fin heat exchanger, Applied Thermal Engineering 23 (2003) pp. 1235-1246.

(Continued)

*Primary Examiner* — Tracy Dove
(74) *Attorney, Agent, or Firm* — Cantor Colburn LLP

(57) ABSTRACT

A fluid tube includes: a first fluid tube; a second fluid tube connected to the first fluid tube; and a flow velocity equalizer in the second fluid tube, where the flow velocity equalizer increases a uniformity of fluid flow passed therethrough, the second fluid tube is wider than the first fluid tube, and the flow velocity equalizer includes a diverging tube and a converging tube. The fluid tube may further include a fluid divider between the flow velocity equalizer and the first fluid tube. The diverging tube of the flow velocity equalizer may have a width increasing in a fluid flow direction, and the converging tube of the flow velocity equalizer may include a plurality of converging tubes having widths decreasing in the fluid flow direction.

20 Claims, 21 Drawing Sheets

(56) References Cited

U.S. PATENT DOCUMENTS

| | | |
|---|---|---|
| 7,527,886 B2 | 5/2009 | Fuller et al. |
| 7,862,956 B2 | 1/2011 | Johnston et al. |
| 7,910,501 B2 | 3/2011 | Jiang et al. |
| 7,968,251 B2 | 6/2011 | Vyas et al. |
| 8,076,039 B2 | 12/2011 | Whiton et al. |
| 8,448,698 B2 | 5/2013 | Genda et al. |
| 2008/0159069 A1 | 7/2008 | Mies et al. |
| 2010/0043230 A1 | 2/2010 | Bhatti |
| 2010/0209789 A1 | 8/2010 | Brandt et al. |
| 2010/0239940 A1 | 9/2010 | Bourgeois et al. |
| 2010/0285382 A1 | 11/2010 | Hasuka et al. |
| 2010/0285383 A1 | 11/2010 | Reinert |

FOREIGN PATENT DOCUMENTS

| | | |
|---|---|---|
| JP | 2005056814 A | 3/2005 |
| JP | 2005116323 A | 4/2005 |
| KR | 1020050020380 A | 3/2005 |
| KR | 100579308 B1 | 5/2006 |
| KR | 100590552 B1 | 6/2006 |
| KR | 100707162 B1 | 4/2007 |
| KR | 100754377 B1 | 8/2007 |
| KR | 100790851 B1 | 12/2007 |
| KR | 1020080008039 A | 1/2008 |
| KR | 1020080076206 A | 8/2008 |
| KR | 1020090072536 A | 7/2009 |
| KR | 1020100063994 A | 6/2010 |
| KR | 1020100121354 A | 11/2010 |
| KR | 1020120012303 A | 2/2012 |
| KR | 101209684 B1 | 12/2012 |
| KR | 1020130102403 A | 9/2013 |

OTHER PUBLICATIONS

C-H. Huang et al., The design of uniform tube flow rates for Z-type compact parallel flow heat exchangers, International Journal of Heat and Mass Transfer 57 (2013) pp. 608-622.

E. Schreck et al., Numerical study of bifurcation in three-dimensional sudden channel expansions, Computers & Fluids 29 (2000) pp. 583-593.

E. V. Rebrov et al., Single-phase fluid flow distribution and heat transfer in microstructured reactors, Chemical Engineering Science 66 (2011) pp. 1374-1393.

H. Fu et al., Threonine aldolase immobilization on different supports for engineering of productive, cost-efficient enzymatic microreactors, Chemical Engineering Journal 207-208 (2012), pp. 564-576.

J. Wen et al., Study of flow distribution and its improvement on the header of plate-fin heat exchanger, Cryogenics 44 (2004) pp. 823-831.

N. Kockmann et al., Scale-up concept for modular microstructured reactors based on mixing, heat transfer, and reactor safety, Chemical Engineering and Processing: Process Intensification 50 (2011), pp. 1017-1026.

T. P. Chiang et al., Spanwise bifurcation in plane-symmetric sudden-expansion flows, the American Physical Society, Physical Review E, vol. 65 (2001), pp. 016306-1-016306-16.

tjskl.org.cn, High Efficiency Copper Tube Fin Air Conditioner Radiator for Heating & Cooling System (2014), pp. 1-4.

Vacuum Brazing of Aluminum Cold Plates and Heat Exchangers, Lytron Inc., May 29, 2014, pp. 1-4.

FIG. 20A
FIG. 20B
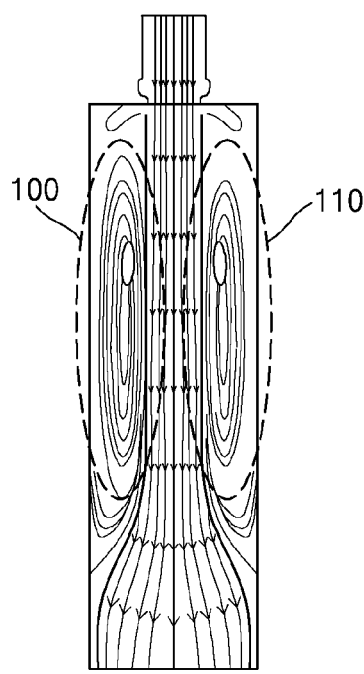
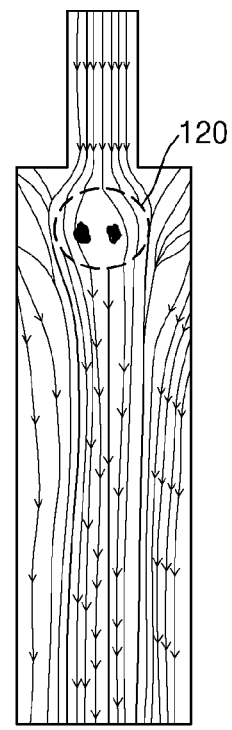

FIG. 24B
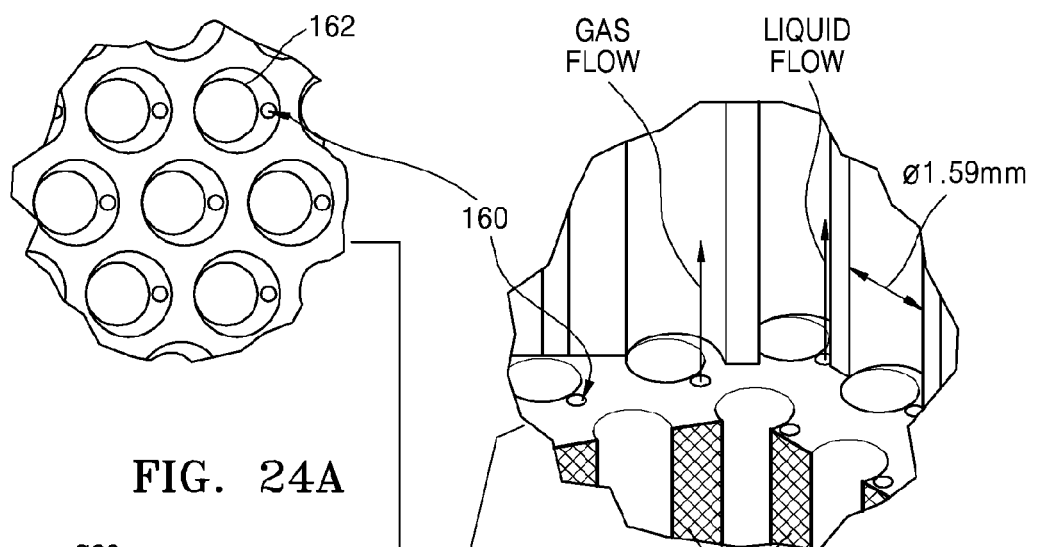
FIG. 24A
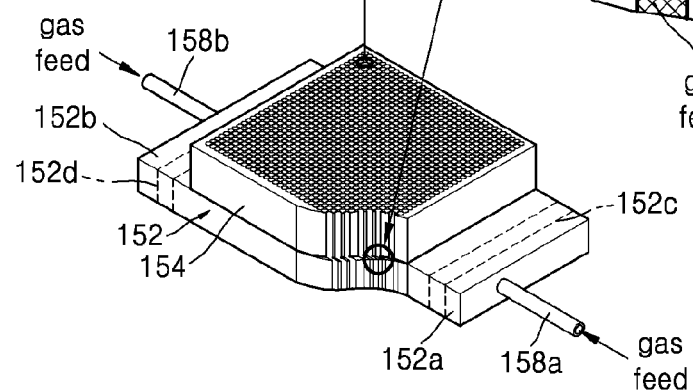
FIG. 24C

FLUID TUBE INCREASING UNIFORMITY OF FLUID FLOW AND APPARATUS INCLUDING THE SAME

RELATED APPLICATIONS

This application claims priority to Korean Patent Application No. 10-2013-0104514, filed on Aug. 30, 2013, and all the benefits accruing therefrom under 35 U.S.C. §119, the content of which in its entirety is herein incorporated by reference.

BACKGROUND

1. Field

The disclosure relates to a fluid tube and an apparatus including the fluid tube, and more particularly, to a fluid tube in which the uniformity of fluid flow is increased, and an apparatus including the fluid tube.

2. Description of the Related Art

The output power of fuel cell stacks may be increased by improving the performance of a membrane electrode assembly ("MEA"), increasing the area of the MEA, or increasing the number of fuel cells of a stack.

The flow rates of air and hydrogen used as fuel of a fuel cell stack are increased to increase the output power of the fuel cell stack. Therefore, the inflow of fuel through a manifold and the distribution of the fuel to cells may be important in fuel cell stack design.

A manifold is included in a bipolar plate ("BP") of a fuel cell stack to introduce/discharge fuel, air, and coolant.

As the area of an MEA is increased for high output power of a fuel cell stack, the flow rates of fuel and air are increased, causing an increase in the size of a manifold.

Circular or square manifolds are widely used. However, square manifolds require a large BP, and thus the material cost of fuel cells and the size of a fuel cell stack may be increased.

SUMMARY

Provided is a fluid tube that decreases abnormal fluid flows therein (such as a flow separation phenomenon) caused by a flow velocity difference.

Provided is an apparatus including the fluid tube.

According to an embodiment of the invention, a fluid tube includes: a first fluid tube; a second fluid tube connected to the first fluid tube; and a flow velocity equalizer in the second fluid tube, where the flow velocity equalizer increases a uniformity of fluid flow passed therethrough, the second fluid tube is wider than the first fluid tube, and the flow velocity equalizer includes a diverging tube and a converging tube.

In an embodiment, the fluid tube may further include a fluid divider between the flow velocity equalizer and the first fluid tube.

In an embodiment, the diverging tube may have a width increasing in a fluid flow direction, and the converging tube may include a plurality of converging tubes having widths decreasing in the fluid flow direction.

In an embodiment, the converging tube may have a width decreasing in a fluid flow direction, and the diverging tube may include a plurality of diverging tube having widths increasing in the fluid flow direction.

In an embodiment, the flow velocity equalizer may have substantially the same outer shape as a cross-section of the second fluid tube.

In an embodiment, two converging tubes may be disposed at both sides of the diverging tube, respectively. In such an embodiment, the converging tubes may be arranged around the diverging tube.

In an embodiment, two diverging tubes may be disposed at both sides of the converging tube, respectively. In such an embodiment, the diverging tubes may be arranged around the converging tube.

In an embodiment, a plurality of holes widening in the fluid flow direction may be defined in the diverging tube.

In an embodiment, a plurality of holes narrowing in the fluid flow direction may be defined in the converging tube.

In an embodiment, a density of the plurality of holes may be highest in a center region of the diverging or converting tube and decreased toward an edge region of the diverging or converting tube.

In an embodiment, the plurality of holes may have a slit or rectangular shape.

In an embodiment, the plurality of holes has a slit shape, and sizes of entrances of the plurality of holes may be different from each other.

In an embodiment, the plurality of holes has a slit shape, and sizes of exits of the plurality of holes may be different from each other.

According to another embodiment of the invention, an apparatus includes the fluid tube for inflow or outflow of fluid, and the fluid tube includes the flow velocity equalizer to increase uniformity of a fluid flow.

In an embodiment, the fluid tube may include a manifold of a fuel cell stack. In such an embodiment, the fluid tube may include a fluid inlet or outlet of a heat exchanger, and the fluid tube may include a fluid inlet or outlet of a reactor.

In such an embodiment, one of fuel, air and refrigerant may be supplied through the manifold. In such an embodiment, one of fuel, air, and refrigerant may be discharged through the manifold.

In such an embodiment, the flow velocity equalizer may be provided at one of an end plate, an insulation plate, a current collector and a bipolar plate of the fuel cell stack.

In such an embodiment, the flow velocity equalizer may be defined by a machined pattern in one of the end plate, the insulation plate, the current collector and the bipolar plate.

According to embodiments of the invention, the fluid tube includes the flow velocity equalizer at a position where a flow velocity difference is present, so as to reduce the flow velocity difference. Therefore, abnormal fluid flows such as a flow separation phenomenon caused by a flow velocity difference may be reduced for uniform supply of fluid.

In an embodiment the apparatus to which the fluid tube is applied (e.g., a fuel cell stack, a heat exchanger or a reactor), fluid may be uniformly supplied to a desired region. Thus, a reaction may uniformly occur in the entirety of the region, and thus the performance of the apparatus may be improved. In an embodiment, where the fluid is a fuel, the fuel may be efficiently used.

In an embodiment where the apparatus is a fuel cell stack, the fluid tube may be applied to a manifold to uniformly supply gas (e.g., fuel or air) to each cell of the fuel cell stack and thus to lead to uniform fuel cell reactions throughout the entirety of the fuel cell stack. Therefore, the performance of cells of the fuel cell stack may be less deviated, and a flow separation phenomenon may be reduced to reduce process loss, thereby reducing balance of plant ("BOP") power consumption.

BRIEF DESCRIPTION OF THE DRAWINGS

These and/or other features of the invention will become apparent and more readily appreciated from the following description of embodiments, taken in conjunction with the accompanying drawings, in which:

FIGS. 20A and 20B show fluid flow distributions in the simulation of FIG. 19, showing variations of a flow separation phenomenon in a manifold in the conventional fuel cell stack in which the fluid tube is not included and in the embodiment of the fuel cell stack in which the fluid tube is included, respectively;

FIGS. 24A to 24C are perspective views illustrating embodiments of a gas plenum and an adjacent monolith of the reactor of FIG. 23.

DETAILED DESCRIPTION

Figure 1:
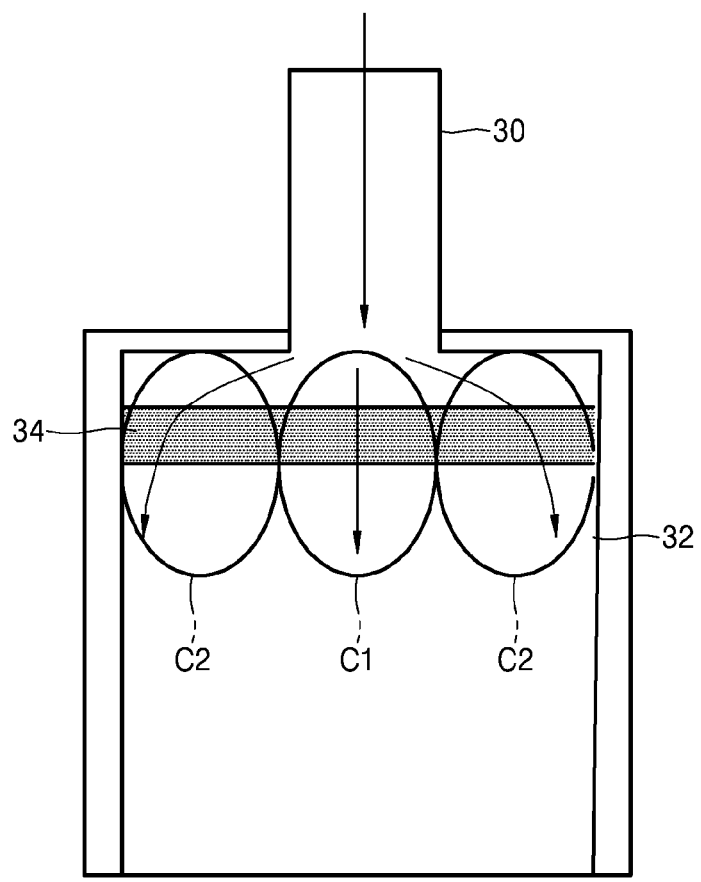
FIG. 1 is a cross-sectional view illustrating an embodiment of a fluid tube in which the uniformity of fluid flow is increased, according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of a fluid tube, in which the uniformity of fluid flow is increased, and embodiments of an apparatus including the fluid tube, according to embodiments of the invention, will be described with reference to the accompanying drawings.

FIG. 1 is a cross-sectional view illustrating an embodiment of a fluid tube in an apparatus, according to the invention.

Referring to FIG. 1, an embodiment of the fluid tube includes a first fluid tube 30 and a second fluid tube 32. The first and second fluid tubes 30 and 32 are connected to each other. Fluid is introduced into the first fluid tube 30 and then flows in the second fluid tube 32. The fluid may be gas or liquid. The diameter of the second fluid tube 32 may be greater than the diameter of the first fluid tube 30. The second fluid tube 32 includes a flow velocity equalizer 34 that is disposed close to the first fluid tube 30. In such an embodiment, positional flow velocity difference of fluid introduced into the second fluid tube 32 through the first fluid tube 30 may be controlled as passing through the flow velocity equalizer 34.

In such an embodiment, as the fluid is introduced from the first fluid tube 30 into the second fluid tube 32 that is wider than the first fluid tube 30, the velocity of the fluid differs at a center region C1 and a peripheral region C2 around the center region C1. That is, since the first fluid tube 30 is connected to the center region C1 of the second fluid tube 32, the flow velocity is greater at the center region C1 than at the peripheral region C2. Due to such a flow velocity difference, the fluid introduced into the center region C1 swirls toward the peripheral region C2. As a result, some of the fluid introduced in the peripheral region C2 does not flow in a preset direction, but undergoes a flow separation phenomenon. Due to such a flow separation phenomenon, the flow velocity difference between regions of the second fluid tube 32 may be excessively increased, and thus the amount of fluid supply therethrough may not be substantially uniform. Therefore, the fluid may not be uniformly supplied to each region of the apparatus connected to the second fluid tube 32, and thus the performance of the apparatus may be lowered.

The flow velocity equalizer 34 may be provided in a fluid inlet to effectively prevent such a flow separation phenomenon, and may include a decelerating structure at a position corresponding to the center region C1 to decrease flow velocity of fluid passing therethrough and an accelerating structure at a position corresponding to the peripheral region C2 to increase flow velocity of fluid passing therethrough. In an embodiment, where the flow velocity equalizer 34 is disposed in a fluid outlet, the flow velocity equalizer 34 may include an accelerating structure at a position corresponding to the center region C1 to increase flow velocity and a decelerating structure at a position corresponding to the peripheral region C2 to decrease flow velocity.

In such an embodiment, flow velocity may be reduced at the center region C1 and increased at the peripheral region C2 by the flow velocity equalizer to reduce velocity deviation between regions. Therefore, the amount of fluid supply to the apparatus connected to the second fluid tube 32 may be substantially constantly maintained based on the operation of the apparatus, and thus the amount of fluid supply to each region of the apparatus may be substantially uniformly maintained not to lower the performance of the apparatus.

Figure 2:
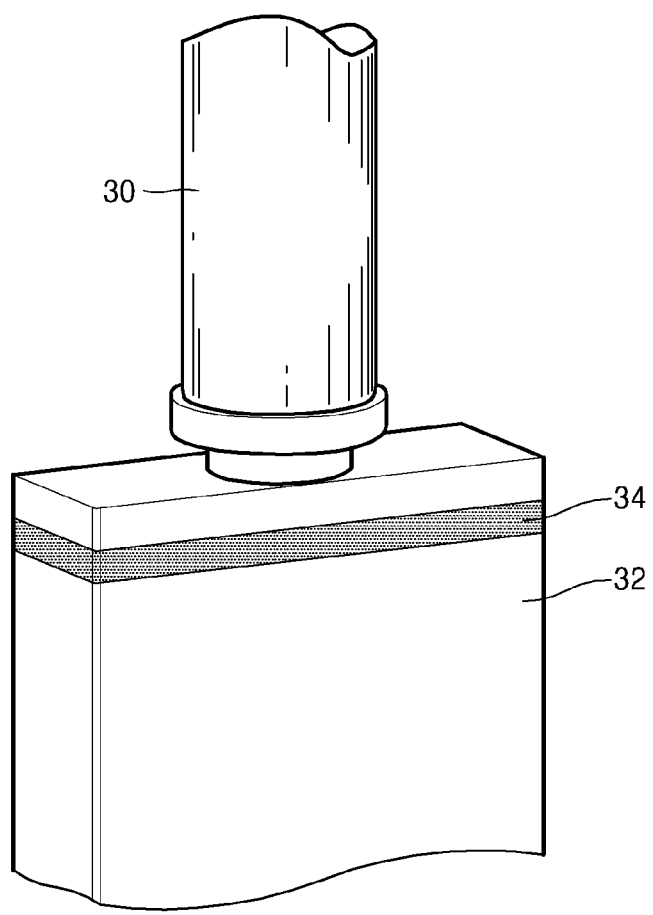
FIG. 2 is a perspective view illustrating an embodiment of the fluid tube of FIG. 1.

FIG. 2 is a perspective view illustrating an embodiment of the fluid tube of FIG. 1. As described later, the fluid tubes illustrated in FIG. 1 may have various three-dimensional structures, as shown in FIG. 2.

Referring to FIG. 2, in an embodiment, the first fluid tube 30 is a circular tube, and the second fluid tube 32 is a rectangular tube. The second fluid tube 32 may be a tube having an inner fluid flow space, or a passage or space formed in a tube may be referred to as the second fluid tube 32. The flow velocity equalizer 34 may be inserted in the second fluid tube 32 at a predetermined position. In an embodiment, where the second fluid tube 32 is a penetration hole formed in a plate having a thickness, the flow velocity equalizer 34 may be formed at a side of the penetration hole by machining the plate. In such an embodiment, the flow velocity equalizer 34 and the plate are formed as a single unitary and indivisible unit.

Next, various embodiments of the flow velocity equalizer 34 will be described.

Figure 3A:
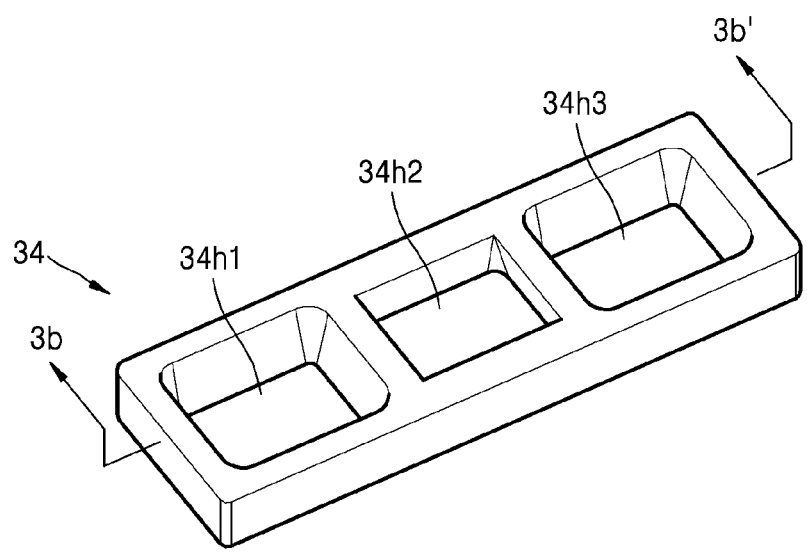
FIGS. 3A and 3B respectively are perspective and cross-sectional views illustrating an embodiment of a flow velocity equalizer of the fluid tube illustrated in FIG. 1.
Figure 3B:
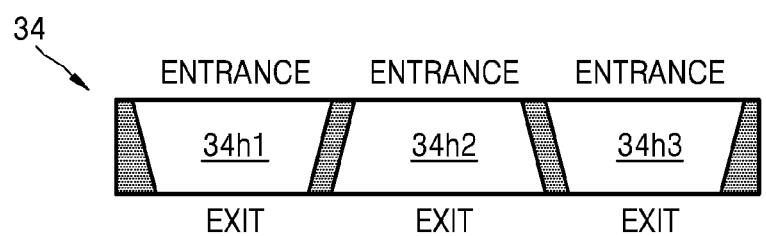

FIGS. 3A and 3B are perspective and cross-sectional views illustrating an embodiment of a flow velocity equalizer of the fluid tube illustrated in FIG. 1.

As shown in FIG. 3A, an embodiment of the flow velocity equalizer 34 may have a rectangular shape and predetermined thickness with first and third penetration holes 34$h$1 and 34$h$3 in both sides and a second penetration hole 34$h$2 in a center region. The second penetration hole 34$h$2 is defined between the first and third penetration holes 34$h$1 and 34$h$3. All the first to third penetration holes 34$h$1 to 34$h$3 have tetragonal shapes when viewed from a top plan view. The first and third penetration holes 34$h$1 and 34$h$3 may have substantially the same area and are located in (correspond to) the peripheral region C2 of the second fluid tube 32. The second penetration hole 34$h$2 may be located in (corresponds to) the center region C1 of the second fluid tube 32. The area of the second penetration hole 34h2 may be substantially equal to or different from the area of the first penetration hole 34h1.

FIG. 3B is a cross-sectional view taken along line 3b-3b' of FIG. 3A.

Referring to FIG. 3B, the inner surfaces of the first to third penetration holes 34h1 to 34h3 are sloped. In an embodiment, the first and third penetration holes 34h1 and 34h3 constitute converging tubes having entrances wider than exits. In such an embodiment, the second penetration hole 34h2 constitutes a diverging shape having an entrance narrower than an exit. According to Beroulli's theorem, the velocity of fluid passing through the first and third penetration holes 34h1 and 34h3 is increased, and the velocity of fluid passing through the second penetration hole 34h2 is decreased. Therefore, in such an embodiment, a flow velocity difference between the center region C1 and the peripheral region C2 at the exits of the first to third penetration holes 34h1 to 34h3 may be reduced by adjusting the sizes of the first to third penetration holes 34h1 to 34h3 according to Beroulli's theorem.

Figure 4A:
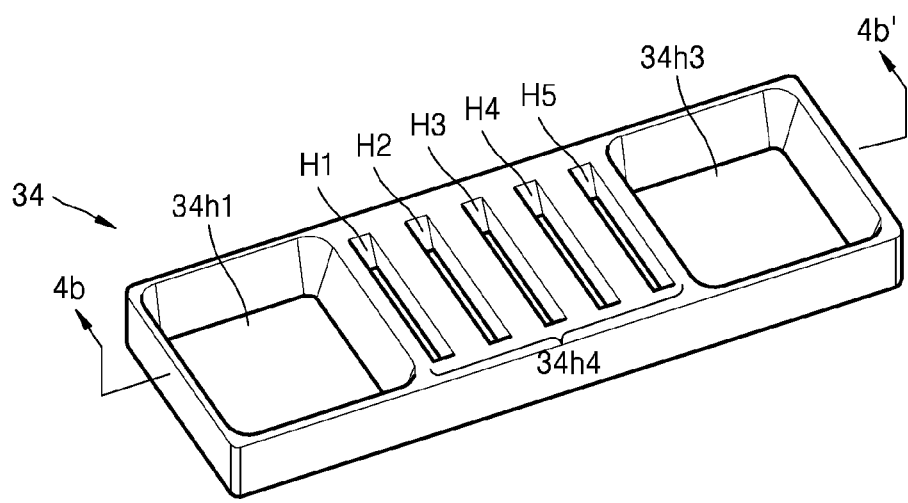
FIGS. 4A and 4B respectively are perspective and cross-sectional views illustrating an embodiment of the flow velocity equalizer of the fluid tube illustrated in FIG. 1.
Figure 4B:
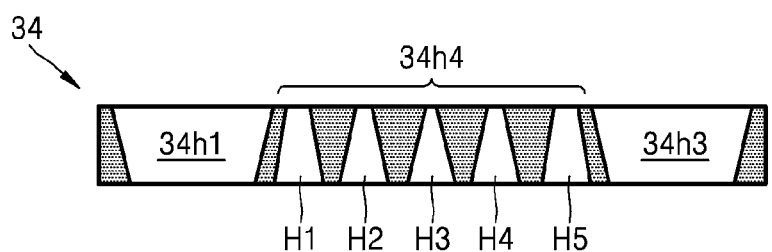

FIGS. 4A and 4B are perspective and cross-sectional views of another embodiment of the flow velocity equalizer 34. FIG. 4B is a cross-sectional view taken along line 4b-4b' of FIG. 4A.

Referring to FIGS. 4A and 4B, an alternative embodiment of the flow velocity equalizer 34 includes a first penetration hole 34h1, a third penetration hole 34h3 and a fourth penetration hole 34h4. The fourth penetration hole 34h4 is disposed between the first penetration hole 34h1 and the third penetration hole 34h3. The fourth penetration hole 34h4 includes first to fifth holes H1 to H5, but not being limited thereto. In an alternative embodiment, the fourth penetration hole 34h4 may include more or less than five holes. The first to fifth holes H1 to H5 may have narrow and long slit-shaped entrances. The first to fifth holes H1 to H5 may have the same length as each other but different entrance widths from each other. In one embodiment, for example, as shown in FIG. 4B, the first to fifth holes H1 to H5 may have sloped inner surfaces and may be sequentially arranged in a direction from the first penetration hole 34h1 to the third penetration hole 34h3. In such an embodiment, the entrance width of the third hole H3 may be smallest. The hole distribution of the fourth penetration hole 34h4 may be dense at a center region and less dense in directions toward the first and third penetration holes 34h1 and 34h3. The entrance widths of the second and fourth holes H2 and H4 disposed at both sides of the third hole H3 may be substantially equal and greater than the entrance width of the third hole H3. The entrance widths of the first and fifth holes H1 and H5 may be substantially equal and greater than the entrance widths of the second and fourth holes H2 and H4. In an embodiment, the entrance widths of the first to fifth holes H1 to H5 are different as described above, and the exit widths thereof may be substantially equal to each other. The entrance widths of the first to fifth holes H1 to H5 are smaller than the exit widths of the first to fifth holes H1 to H5, respectively. In such an embodiment, the first to fifth holes H1 to H5 constitute diverging tubes, and the velocity of fluid passing through the first to fifth holes H1 to H5 is decreased according to Bernoulli's theorem.

Figure 5A:
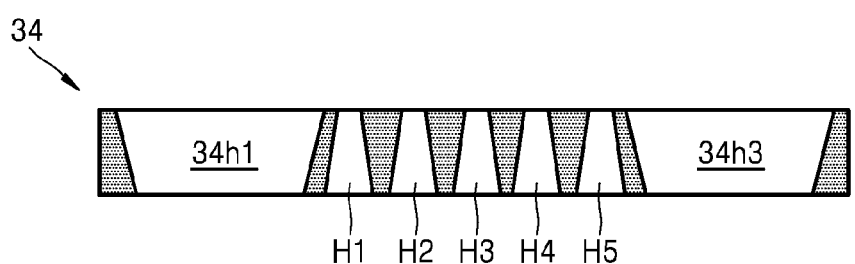
FIGS. 5A and 5B are cross-sectional views illustrating alternative embodiments of the flow velocity equalizer illustrated in FIG. 1.
Figure 5B:
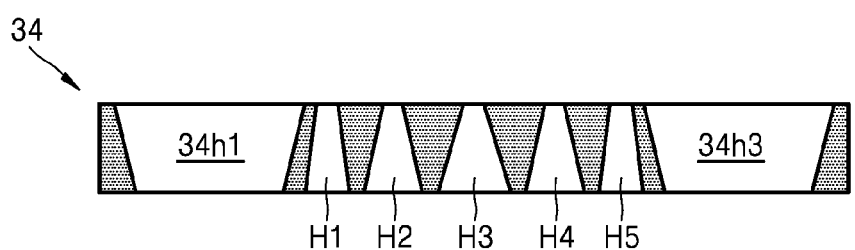

FIGS. 5A and 5B are cross-sectional views illustrating alternative embodiments of the flow velocity equalizer illustrated in FIG. 1, which are substantially the same as the embodiment shown in FIG. 4B except for the fourth penetration hole 34h4.

As shown in FIG. 5A, in another embodiment, the first to fifth holes H1 to H5 may have the same entrance width and the same exit width as each other. In another alternative embodiment, as shown in FIG. 5B, the first to fifth holes H1 to H5 may have the same entrance width as each other but different exit widths from each other. In such an embodiment, referring to FIG. 5B, the central third hole H3 has the greatest exit width. The second and fourth holes H2 and H4 disposed at both sides of the third hole H3 may have the same exit width, which is the second biggest next to the third hole H3. The outermost first and fifth holes H1 and H5 may have the same smallest exit width. Hole density may be decreased from the center to the edge of the fourth penetration hole 34h4.

As described above, in embodiments of the invention, the first to fifth holes H1 to H5 may have various entrance widths and exit widths and the number of first to fifth holes H1 to H5 may be variously modified to more precisely control the velocity of introduced fluid.

Figure 6A:
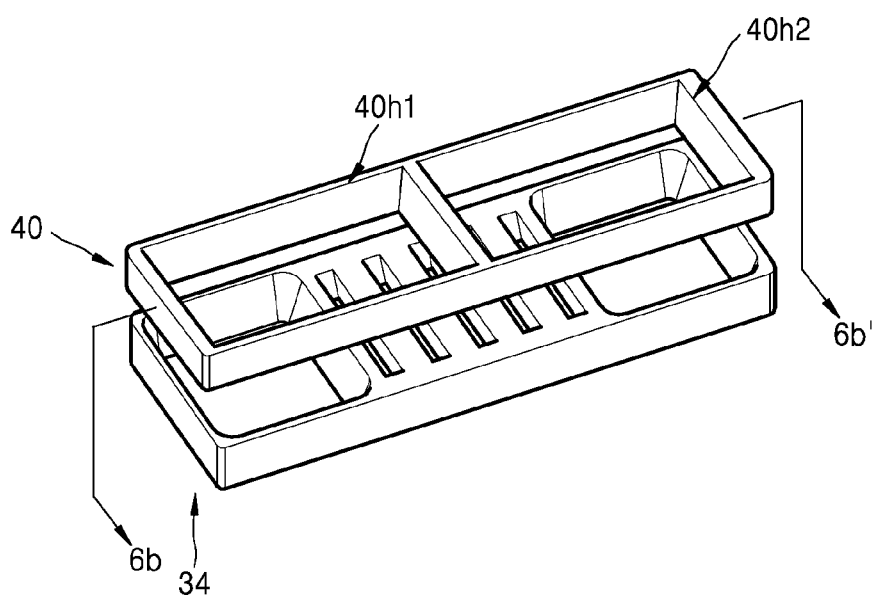
FIGS. 6A and 6B respectively are perspective and cross-sectional views illustrating an embodiment of a fluid divider provided in front of the flow velocity equalizer illustrated in FIGS. 4A and 4B.
Figure 6B:
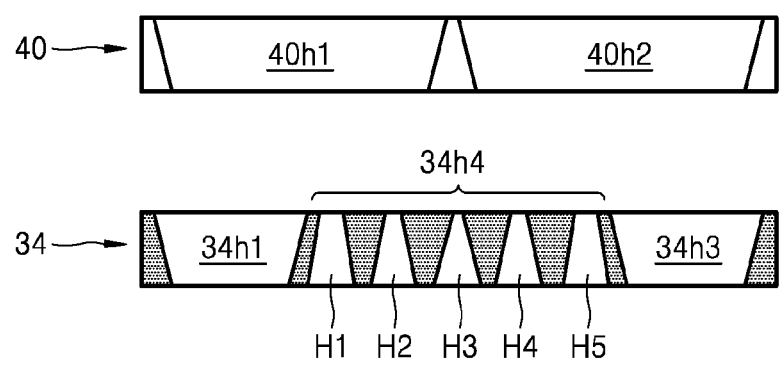

FIGS. 6A and 6B illustrate an embodiment of a fluid divider 40 provided in front of the flow velocity equalizer 34 illustrated in FIGS. 4A and 4B.

Referring to FIGS. 6A and 6B, an embodiment of the fluid divider 40 is disposed in front of the flow velocity equalizer 34. The flow velocity equalizer 34 and the fluid divider 40 may be in contact with each other. The fluid divider 40 divides fluid to be introduced into the flow velocity equalizer 34 into two streams. The fluid divider 40 may be a rectangular plate having a thickness, and the outer shape of the fluid divider 40 may be substantially the same as the outer shape of the flow velocity equalizer 34. The fluid divider 40 includes first and second penetration holes 40h1 and 40h2. The first penetration hole 40h1 corresponds to the whole first penetration hole 34h1 and one portion of the fourth penetration hole 34h4. The second penetration hole 40h2 corresponds to the whole third penetration hole 34h3 and another portion of the fourth penetration hole 34h4. Therefore, a portion of fluid introduced into the second fluid tube 32 flows into the one portion of the fourth penetration hole 34h4 and the first penetration hole 34h1 of the flow velocity equalizer 34 through the first penetration hole 40h1 of the fluid divider 40. The other portion of the fluid introduced into the second fluid tube 32 flows into the other portion of the fourth penetration hole 34h4 and the third penetration hole 34h3 of the flow velocity equalizer 34 through the second penetration hole 40h2 of the fluid divider 40.

Referring to FIG. 6B, in an embodiment, the first and second penetration holes 40h1 and 40h2 of the fluid divider 40 have sloped inner surfaces. In such an embodiment, the first and second penetration holes 40h1 and 40h2 have entrances wider than exits thereof.

In FIGS. 6A and 6B, the flow velocity equalizer 34 is disposed below the fluid divider 40. In an embodiment, the flow velocity equalizer 34 may be configured as shown in FIG. 4A, 4B, 5A or 5B. In an alternative embodiment, the flow velocity equalizer 34 may be configured as shown in FIGS. 3A and 3B.

The fluid divider 40 may be used together with another embodiment of the flow velocity equalizer 34 (e.g., embodiments described below). In such an embodiment, the outer shape of the fluid divider 40 may be variously modified based on the shape of the flow velocity equalizer 34.

Figure 7:
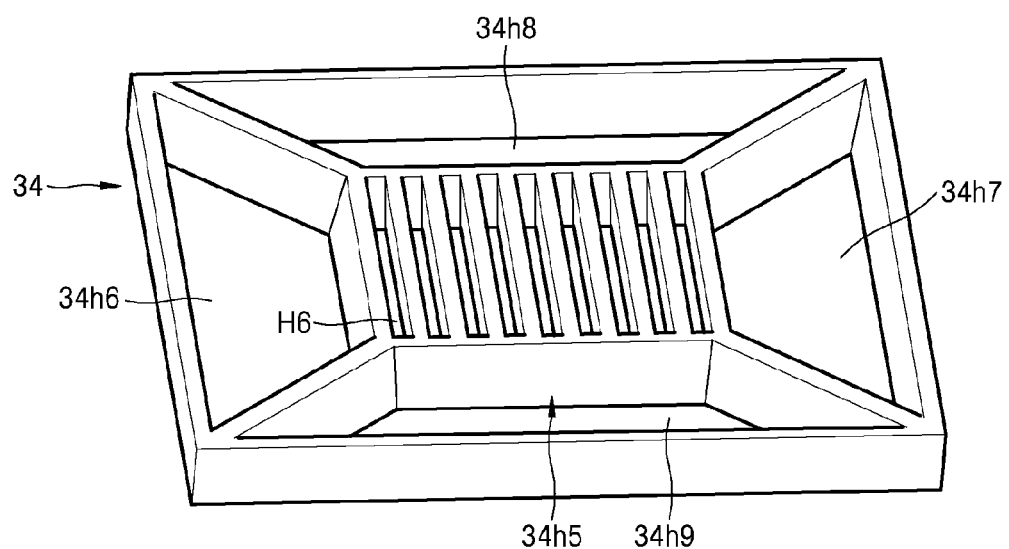
FIGS. 7 and 8 are perspective views illustrating alternative embodiments of the flow velocity equalizer of FIG. 1.

FIG. 7 illustrates another embodiment of the flow velocity equalizer 34.

Referring to FIG. 7, another embodiment of the flow velocity equalizer 34 is a rectangular plate having a thickness. In such an embodiment, a fifth penetration hole 34h5 is defined or formed in a center region, and sixth, seventh, eighth and ninth penetration holes 34*h*6, 34*h*7, 34*h*8 and 34*h*9 are arranged around the fifth penetration hole 34*h*5. The sixth to ninth penetration holes 34*h*6 to 34*h*9 constitute converging tubes having exits narrower than entrances. The sixth and seventh penetration holes 34*h*6 and 34*h*7 are symmetric to each other with reference to the fifth penetration hole 34*h*5. The eighth and ninth penetration holes 34*h*8 and 34*h*9 are symmetric to each other with reference to the fifth penetration hole 34*h*5. The sixth to ninth penetration holes 34*h*6 to 34*h*9 are disposed in four directions of the fifth penetration hole 34*h*5, respectively. Each of the sixth to ninth penetration holes 34*h*6 to 34*h*9 may have a trapezoid shape such as an isosceles trapezoid shape, for example. The fifth penetration hole 34*h*5 includes a plurality of sixth holes H6. The plurality of sixth holes H6 constitutes diverging tubes having exits wider than entrances. The shapes of the plurality of sixth holes H6 may be substantially the same as or similar to the shapes of the first to fifth holes H1 to H5 shown in FIG. 4B, FIG. 5A or FIG. 5B.

Figure 8:
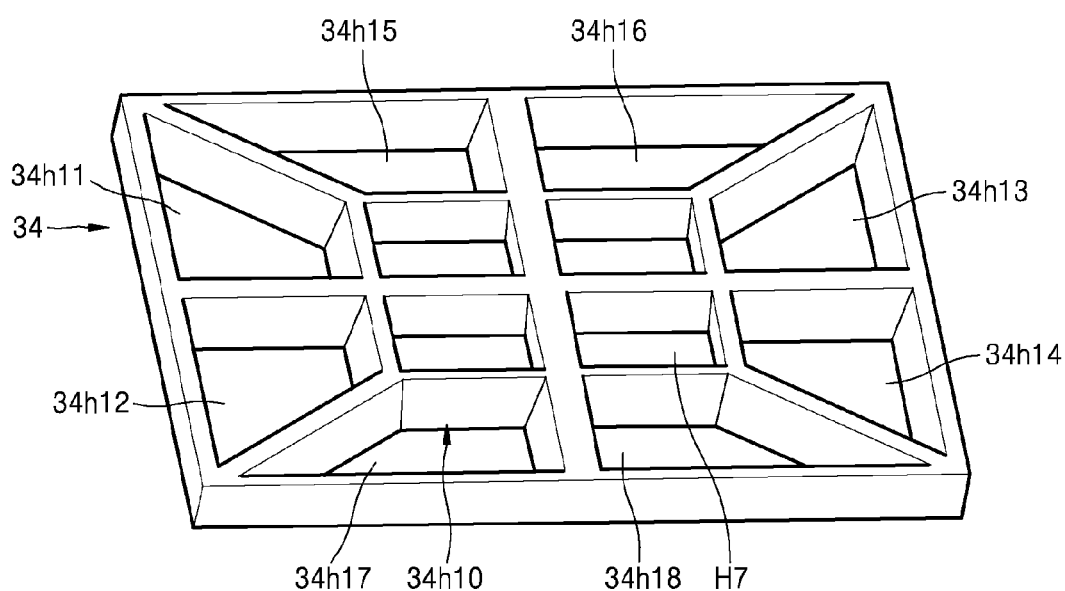

FIG. 8 illustrates another embodiment of the flow velocity equalizer 34.

Referring to FIG. 8, an embodiment of the flow velocity equalizer 34 is a rectangular plate having a thickness. A tenth penetration hole 34*h*10 is defined or formed in a center region, and eleventh to eighteenth penetration holes 34*h*11 to 34*h*18 are arranged around the tenth penetration hole 34*h*10. The eleventh to eighteenth penetration holes 34*h*11 to 34*h*18 constitute converging tubes having exits narrower than entrances. The eleventh and twelfth penetration holes 34*h*11 and 34*h*12 are symmetric to each other. The eleventh and twelfth penetration holes 34*h*11 and 34*h*12 are disposed in a first direction of the tenth penetration hole 34*h*10. The thirteenth and fourteenth penetration holes 34*h*13 and 34*h*14 are symmetric to each other and are disposed in a second direction of the tenth penetration hole 34*h*10. The eleventh and twelfth penetration holes 34*h*11 and 34*h*12 are symmetric to the thirteenth and fourteenth penetration holes 34*h*13 and 34*h*14 about the tenth penetration hole 34*h*10.

The fifteenth and sixteenth penetration holes 34*h*15 and 34*h*16 are symmetric to each other. The fifteenth and sixteenth penetration holes 34*h*15 and 34*h*16 are disposed in a third direction of the tenth penetration hole 34*h*10. The seventeenth and eighteenth penetration holes 34*h*17 and 34*h*18 are symmetric to each other and are disposed in a fourth direction of the tenth penetration hole 34*h*10. The fifteenth and sixteenth penetration holes 34*h*15 and 34*h*16 are symmetric to the seventeenth and eighteenth penetration holes 34*h*17 and 34*h*18 about the tenth penetration hole 34*h*10. The first and second directions are opposite, and the third and fourth directions are opposite. The first and second directions are perpendicular to the third and fourth directions. The tenth penetration hole 34*h*10 includes a plurality of seventh holes H7. The plurality of seventh holes H7 constitutes diverging tubes having entrances narrower than exits. In FIG. 8, the tenth penetration hole 34*h*10 includes four seventh holes H7, but not being limited thereto. In an alternative embodiment, the tenth penetration hole 34*h*10 may include more or less than four holes. Each of the plurality of seventh holes H7 has a tetragonal shape. The eleventh and twelfth penetration holes 34*h*11 and 34*h*12 may be provided by dividing the sixth penetration hole 34*h*6 shown in FIG. 7 into two parts. The thirteenth and fourteenth penetration holes 34*h*13 and 34*h*14 may be provided by dividing the seventh penetration hole 34*h*7 shown in FIG. 7 into two parts. The fifteenth and sixteenth penetration holes 34*h*15 and 34*h*16 may be provided by dividing the eighth penetration hole 34*h*8 shown in FIG. 7 into two parts.

The seventeenth and eighteenth penetration holes 34*h*17 and 34*h*18 may be provided by dividing the ninth penetration hole 34*h*9 shown in FIG. 7 into two parts.

Figure 9:
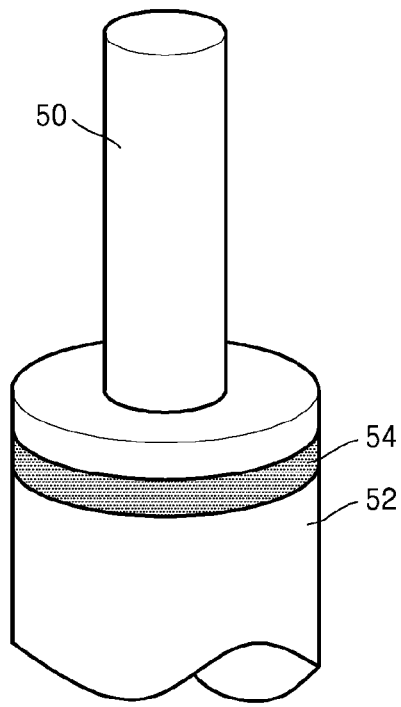
FIG. 9 is a perspective view illustrating another embodiment of the fluid tube of FIG. 1.

FIG. 9 illustrates another embodiment of the fluid tube of FIG. 1.

Referring to FIG. 9, an embodiment of the fluid tube includes a first fluid tube 50 and a second fluid tube 52 connected to each other. The first fluid tube 50 has a diameter smaller than that of the second fluid tube 52. The first fluid tube 50 may correspond to the first fluid tube 30 shown in FIG. 2. The second fluid tube 52 has a cylindrical shape. The second fluid tube 52 of FIG. 9 may have the same structure and function as those of the second fluid tube 32 of FIG. 2 except for the outer shape. The second fluid tube 52 includes a velocity equalizer 54. The flow velocity equalizer 54 has a circular outer shape. The flow velocity equalizer 54 shown in FIG. 9 may have the same function and internal structure as those of the flow velocity equalizer 34 shown in FIGS. 1 and 2 except for the outer shape.

Figure 10:
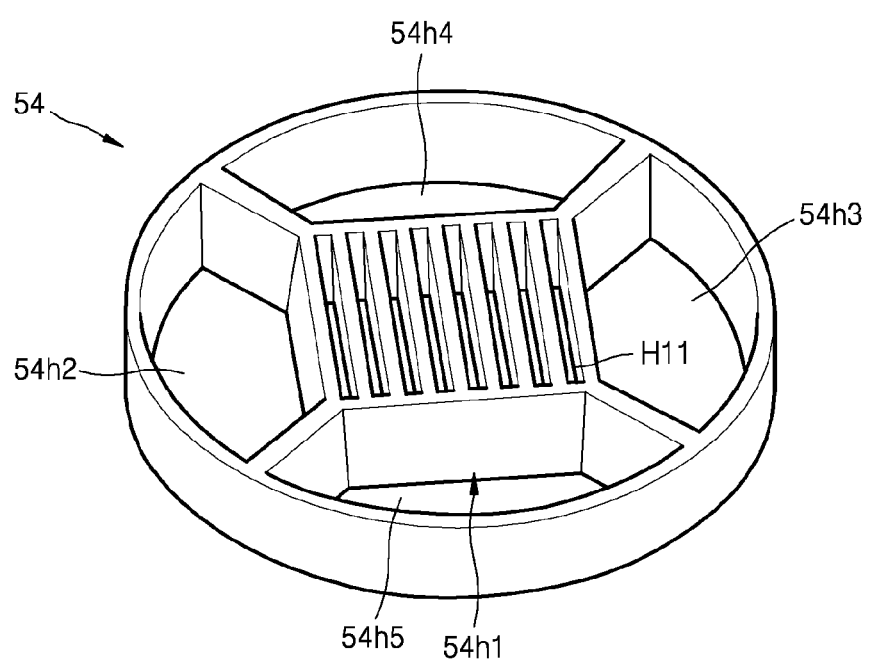
FIG. 10 is a perspective view illustrating an embodiment of a flow velocity equalizer in the fluid tube of FIG. 9.

FIG. 10 illustrates an embodiment of the flow velocity equalizer 54 of FIG. 9.

Referring to FIG. 10, the flow velocity equalizer 54 is a circular plate having a thickness. A first penetration hole 54*h*1 is defined or formed in a center region, and second to fifth penetration holes 54*h*2 to 54*h*5 are arranged around the first penetration hole 54*h*1. The first penetration hole 54*h*1 constitutes a diverging tube for decreasing the velocity of fluid. The second to fifth penetration holes 54*h*2 to 54*h*5 constitute converging tubes for increasing the velocity of fluid. The second and third penetration holes 54*h*2 and 54*h*3 are symmetric to each other with reference to the first penetration hole 54*h*1. The fourth and fifth penetration holes 54*h*4 and 54*h*5 are symmetric to each other with reference to the first penetration hole 54*h*1. The second to fifth penetration holes 54*h*2 to 54*h*5 may be symmetric to each other. The second to fifth penetration holes 54*h*2 to 54*h*5 are disposed in four directions of the first penetration hole 54*h*1. The first penetration hole 54*h*1 has a tetragonal outer shape. The first penetration hole 54*h*1 includes a plurality of first holes H11. The shapes of the plurality of first holes H11 may be substantially the same as or similar to the shapes of the sixth holes H6 shown in FIG. 7.

Figure 11:
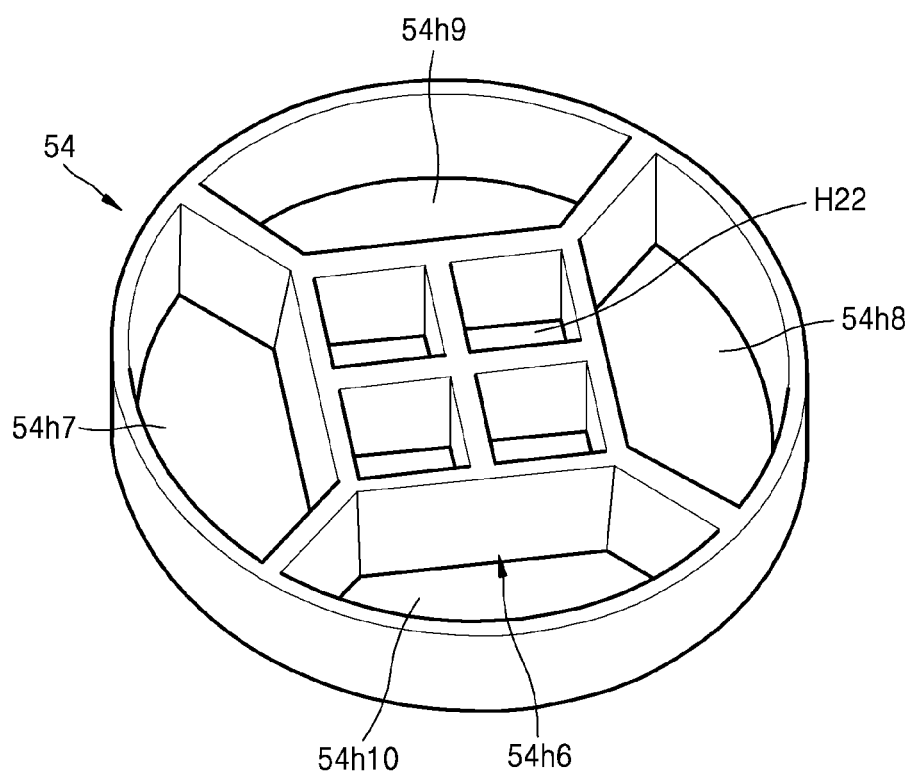
FIG. 11 is a perspective view illustrating another embodiment of the flow velocity equalizer in the fluid tube of FIG. 9.

FIG. 11 illustrates another embodiment of the flow velocity equalizer 54 of FIG. 9.

Referring to FIG. 11, an embodiment of the flow velocity equalizer 54 is a circular plate having a thickness. A sixth penetration hole 54*h*6 is defined or formed in a center region, and seventh to tenth penetration holes 54*h*7 to 54*h*10 are arranged around the sixth penetration hole 54*h*6. The sixth penetration hole 54*h*6 constitutes a diverging tube. The seventh to tenth penetration holes 54*h*7 to 54*h*10 constitute converging tubes. The seventh and eighth penetration holes 54*h*7 and 54*h*8 are symmetric about the sixth penetration hole 54*h*6. The ninth and tenth penetration holes 54*h*9 and 54*h*10 are symmetric about the sixth penetration hole 54*h*6. The seventh and tenth penetration holes 54*h*7 to 54*h*10 may be symmetric to each other. The seventh penetration hole 54*h*7 is disposed in a first direction of the sixth penetration hole 54*h*6. The eighth penetration hole 54*h*8 is disposed in a second direction of the sixth penetration hole 54*h*6, which is opposite to the first direction. The ninth penetration hole 54*h*9 is disposed in a third direction of the sixth penetration hole 54*h*6, which is perpendicular to the first direction. The tenth penetration hole 54*h*10 is disposed in a fourth direction of the sixth penetration hole 54*h*6, which is opposite to the third direction. The sixth penetration hole 54*h*6 has a tetragonal outer shape. The sixth penetration hole 54*h*6 includes a plurality of second holes H22. The plurality of second holes H22 may constitute diverging tubes. The shapes of the plurality of second holes H22 may be equal or similar to the shapes of the seventh holes H7 shown in FIG. 8.

When fluid flows in an opposite direction of the fluid tube of FIG. 1, that is, when the fluid flows from the second fluid tube 32 to the first fluid tube 30 as the first and second fluid tubes 30 and 32 are used as a fluid discharge tube, the flow velocity equalizer 34 described with reference to FIGS. 3 to 8 may be inserted in an opposite direction (e.g., upside down) in the second fluid tube 32 of the fluid discharge tube.

In an embodiment, where the first and second fluid tubes are used as a fluid discharge tube and the second fluid tube has a circular shape as shown in FIG. 9, the flow velocity equalizer 54 described with reference to FIGS. 10 and 9 may be turned over and disposed in the fluid discharge tube. Therefore, any repetitive detailed description of the flow velocity equalizer in the fluid discharge tube will be omitted.

Next, an embodiment of an apparatus including the fluid tube will be described. In the following description, the same reference numerals as those used in the above description denote the same elements.

Figure 12:
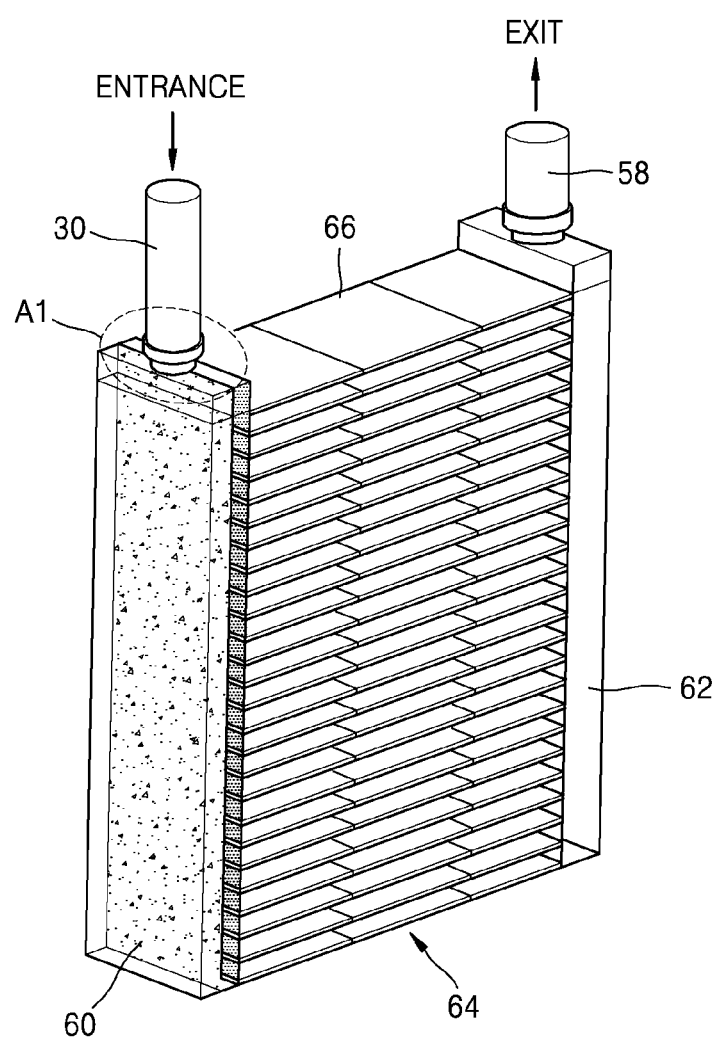
FIG. 12 is a perspective view illustrating an embodiment of a fuel cell stack structure including the fluid tube of FIG. 1.

FIG. 12 illustrates an embodiment of a fuel cell stack structure including the fluid tube of FIG. 1, according to the invention.

Referring to FIG. 12, an embodiment of the fuel cell stack structure includes a first manifold 60, a second manifold 62, and a cell stack 64 between the first and second manifolds 60 and 62. A plurality of cells 66 is stacked in the cell stack 64. The cells 66 may include membrane electrode assemblies ("MEA"s). A plurality of cooling plates (not shown) may be arranged in the cell stack 64. In an embodiment, the number of the cooling plates in the cell stack 64 may be less than the number of the cells in the cell stack 64. In such an embodiment, at least two cells 66 may be disposed between the cooling plates. Fluid is supplied to the cells 66 and discharged from the cells 66 through the first and second manifolds 60 and 62. In such an embodiment, the fuel cell stack structure may further include manifolds for supplying fluid (such as a coolant) to the cooling plates and discharging the fluid from the cooling plates. The manifolds for supplying and discharging fluid to and from the cooling plates may have the same shapes as the first and second manifolds 60 and 62, or may have different shapes from the first and second manifolds 60 and 62. The first fluid tube 30 is connected to an upper end of the first manifold 60. A discharge tube 58 is connected to an upper end of the second manifold 62. Fluid is introduced into the first manifold 60 through the first fluid tube 30 and is discharged to the discharge tube 58 after passing through the cell stack 64 and the second manifold 62. The fluid supplied to the first manifold 60 may be air or fuel for fuel cells. Fuel may be supplied and discharged through the first and second manifolds 60 and 62. In an embodiment, manifolds for supplying and discharging air may have substantially the same shapes as the first and second manifolds 60 and 62 and may be disposed at different positions. The first manifold 60 corresponds to the second fluid tube 32 in which the flow velocity equalizer 34 is provided.

Figure 13:
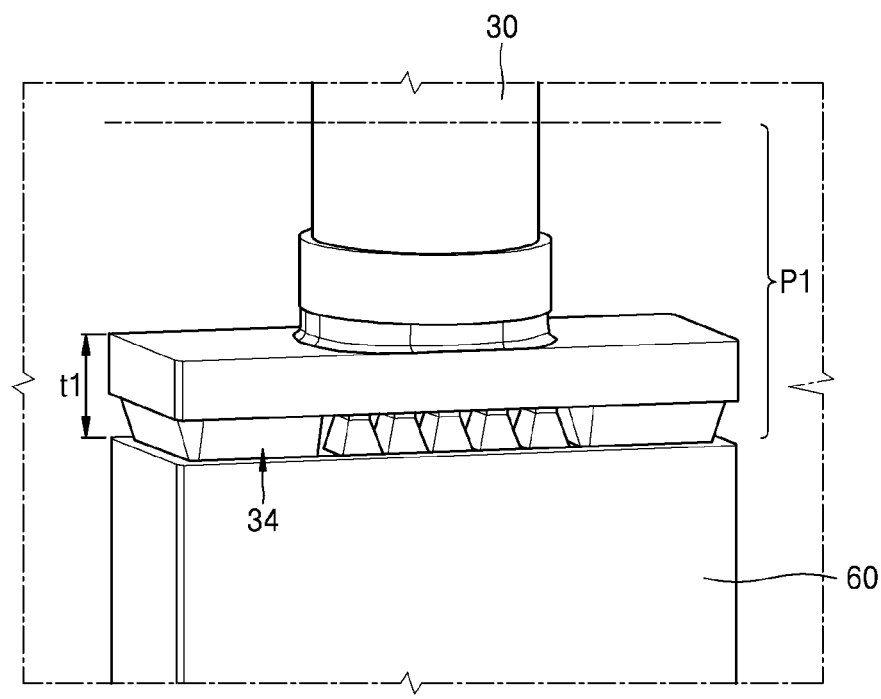
FIG. 13 is an enlarged perspective view illustrating portion A1 of FIG. 12.

FIG. 13 is an enlarged view of portion A1 of FIG. 12.

Referring to FIG. 13, in an embodiment, the first fluid tube 30 is connected to the center of the upper end of the first manifold 60. The first manifold 60 includes the flow velocity equalizer 34. In FIG. 13, P1 denotes a portion which may be included in (surrounded by) an end plate. In an embodiment, the portion P1 corresponds to the thickness of the end plate. In one embodiment, for example, the thickness of the end plate may be about 25 millimeters (mm). In FIG. 13, t1 denotes a distance from the upper end of the first manifold 60 to the lower end of the flow velocity equalizer 34. In one embodiment, for example, the distance t1 may be in a range from about 5 mm to about 7 mm. The distance t1 may vary based on operational characteristics of an apparatus including the flow velocity equalizer 34.

Figure 14A:
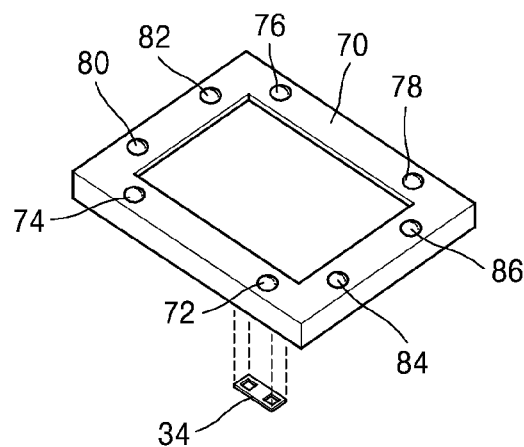
FIGS. 14A to 14C are perspective views illustrating an embodiment of an end plate of the fuel cell stack structure of FIG. 12, in which the flow velocity equalizer is provided.
Figure 14B:
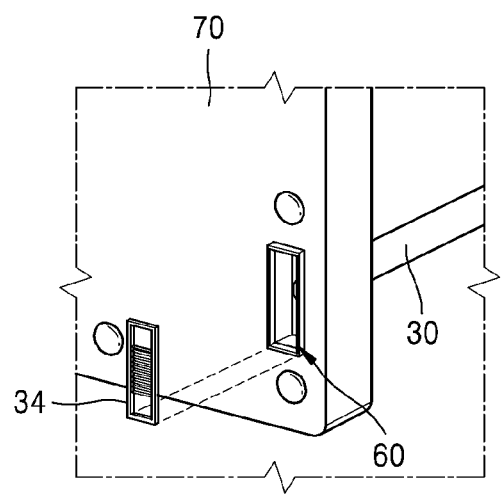
Figure 14C:
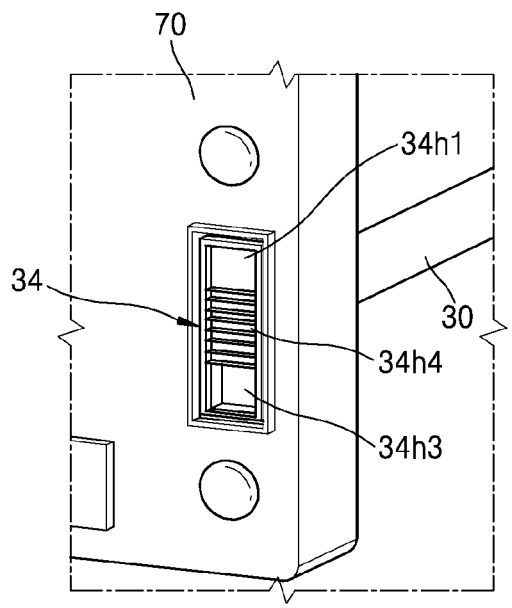

FIGS. 14A to 14C illustrate an embodiment of an end plate 70 of the fuel cell stack structure, in which the flow velocity equalizer 34 is provided.

FIG. 14A is a top perspective view illustrating an embodiment of the end plate 70 of the fuel cell stack structure. FIG. 14*b* is a perspective view illustrating an inner side of the end plate 70. FIG. 14C is an enlarged view of a portion of FIG. 14B in which the flow velocity equalizer 34 is disposed.

Referring to FIG. 14A, the end plate 70 includes a fuel inlet hole 72 for introducing hydrogen or fuel including hydrogen, an air outlet hole 74, a fuel outlet hole 76, an air inlet hole 78, coolant inlet holes 80 and 82, and coolant outlet holes 84 and 86. The first fluid tube 30 may be coupled to each of the inlet holes 72, 78, 80 and 82. Referring to FIG. 14B, the first fluid tube 30 is connected to the fuel inlet hole 72.

Referring to FIGS. 14B and 14C, the flow velocity equalizer 34 is coupled to the first manifold 60 provided or formed in an inner side of the end plate 70. The first manifold 60 is connected to the first fluid tube 30.

Referring to FIGS. 14B and 14C, in an embodiment, the flow velocity equalizer 34 is inserted as an independent part into the first manifold 60 formed in the end plate 70. In an alternative embodiment, the flow velocity equalizer 34 may be integrally formed with the end plate 70 as a single unitary and indivisible unit through a machining process, as shown in FIG. 15.

Figure 15:
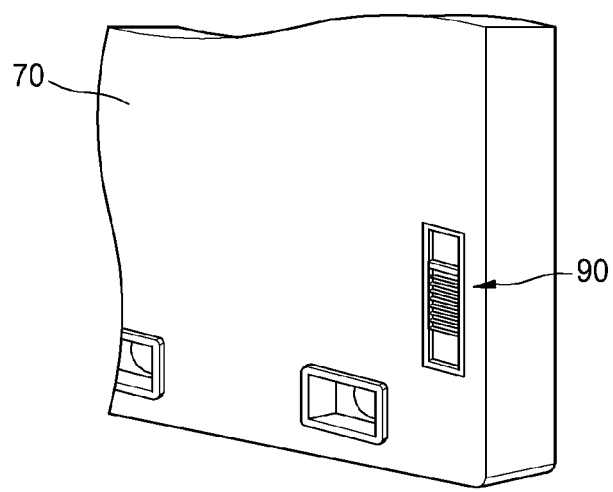
FIG. 15 is perspective view illustrating an embodiment of a flow velocity equalizer formed by machining the end plate of the fuel cell stack structure of FIG. 12.

Referring to FIG. 15, a pattern 90 is machined in an inner side of an end plate 70 at a position where a first manifold 60 is formed. The pattern 90 has the same structure as the flow velocity equalizer 34. The pattern 90 defines a flow velocity equalizer integrally formed with the end plate 70 as a single unitary and indivisible unit. The pattern 90 may be designed as a part of the end plate 70 and may be formed together with the end plate 70.

Figure 16:
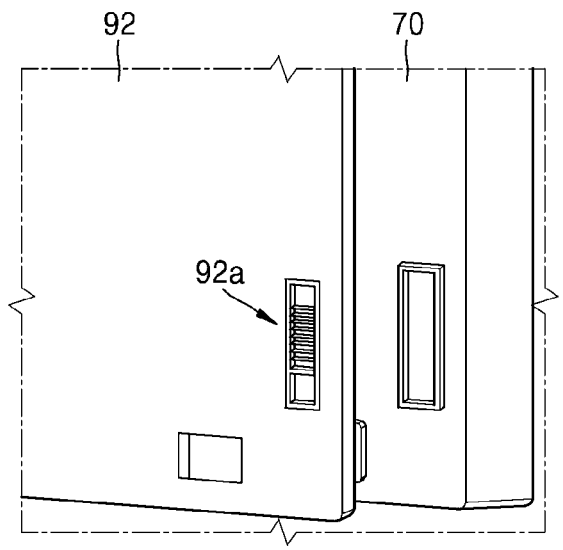
FIG. 16 is perspective view illustrating an embodiment of a flow velocity equalizer formed by machining an insulation plate of the fuel cell stack structure of FIG. 12.

In an embodiment of the fuel cell stack structure, the flow velocity equalizer 34 may be provided in another member instead of the end plate 70. In one embodiment, for example, as shown in FIG. 16, a flow velocity equalizer 92*a* may be provided in an insulation plate 92 disposed on an inner side of the end plate 70. In an embodiment, the insulation plate 92 may be disposed between the end plate 70 and the cells 66 of the fuel cell stack. In such an embodiment, the flow velocity equalizer 92*a* may be a pattern integrally formed with the insulation plate 92 as a single unitary and indivisible unit by machining. In such an embodiment, where the flow velocity equalizer 92*a* is integrally formed with the insulation plate 92 as a single unitary and indivisible unit, a region of the insulation plate 92, in which the flow velocity equalizer 92*a* is formed, constitutes a portion of the first manifold 60, such that the flow velocity equalizer 92*a* is effectively provided in the first manifold 60. In an embodiment, as shown in FIG. 16, the region of the insulation plate 92, in which the flow velocity equalizer 92*a* is formed, corresponds to a region of the embodiment of the end plate 70 in which the pattern 90 is formed as shown in FIG. 15. Therefore, when the end plate 70 and the insulation plate 92 are disposed to be in contact with each other during a stack assembling process, the region of the end plate 70 for the pattern 90 may be brought into contact with the region of the insulation plate 92 in which the flow velocity equalizer 92*a* is formed.

Figure 17:
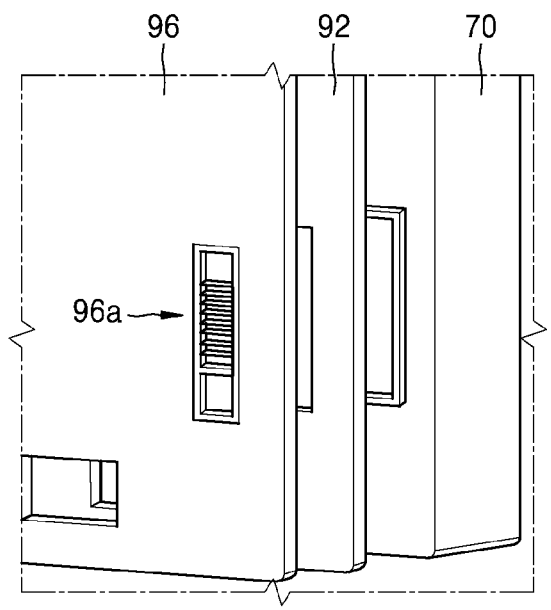
FIG. 17 is perspective view illustrating an embodiment of a flow velocity equalizer formed by machining a current collector of the fuel cell stack structure of FIG. 12.

In an alternative embodiment, as shown in FIG. 17, a flow velocity equalizer 96*a* may be provided in a current collector 96 instead of in the end plate 70 or the insulation plate 92. The current collector 96 is disposed inside the insulation plate 92. The current collector 96 may be disposed between the insulation plate 92 and the cells 66. The flow velocity equalizer 96*a* is formed in a predetermined region of the current collector 96. The region of the current collector 96, in which the flow velocity equalizer 96*a* is formed, corresponds to an opening region of the insulation plate 92 as shown in FIG. 16. In an embodiment, the flow velocity equalizer 96*a* may be integrally formed with the current collector 96 as a single unitary and indivisible unit. In such an embodiment, when the current collector 96 is designed, the flow velocity equalizer 96*a* is designed together with the current collector 96, and when the current collector 96 is machined, the flow velocity equalizer 96*a* is machined together with the current collector 96 to form the flow velocity equalizer 96*a* and the current collector 96 as a single piece.

Figure 18:
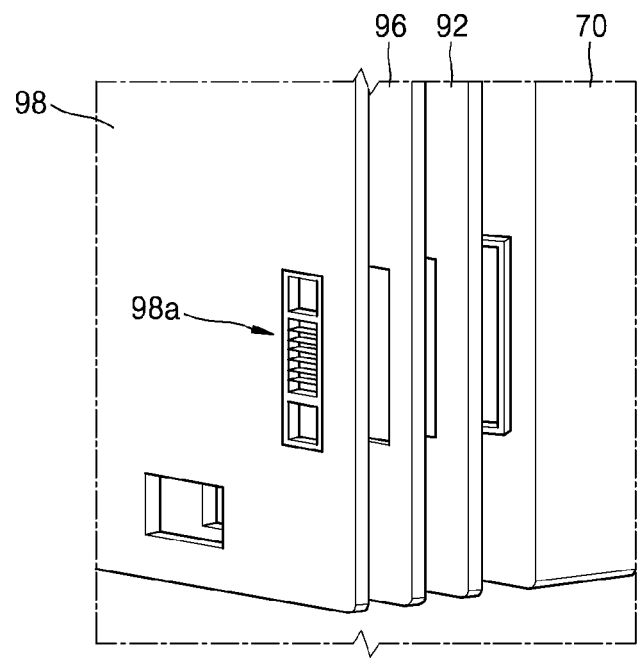
FIG. 18 is perspective view illustrating an embodiment of a flow velocity equalizer formed by machining a bipolar plate (BP) of the fuel cell stack structure of FIG. 12.

In an embodiment, as shown in FIG. 18, a flow velocity equalizer 98*a* may be provided in a bipolar plate 98 instead of in the end plate 70, the insulation plate 92, or the current collector 96. The bipolar plate 98 may be disposed inside the current collector 96. The bipolar plate 98 may be disposed between the current collector 96 and the cells 66. The flow velocity equalizer 98*a* may be provided in a predetermined region of the bipolar plate 98. The region of the bipolar plate 98, in which the flow velocity equalizer 98*a* is formed, corresponds to an opening region of the current collector 96 as shown in FIG. 18. A portion of the first manifold 60 may be provided by: forming the regions of the end plate 70, the insulation plate 92 and the current collector 96 corresponding to the flow velocity equalizers 98*a*; and forming the region of the bipolar plate 98 in which the flow velocity equalizer 98*a*. The flow velocity equalizer 98*a* of the bipolar plate 98 may be designed together with the bipolar plate 98 and may be formed together with the bipolar plate 98 according to design. In this way, the flow velocity equalizer 98*a* may be integrally formed as a single unit with the bipolar plate 98.

In an embodiment where a flow velocity equalizer is provided in the second manifold 62 through which fluid is discharged, the flow velocity equalizer may be provided in one of the end plate 70, the insulation plate 92, the current collector 96 and the bipolar plate 98 as described above with reference to FIGS. 15 to 18. In such an embodiment, diverging tubes and converging tubes of the flow velocity equalizer are reversed as converging tubes and diverging tubes.

Figure 19:
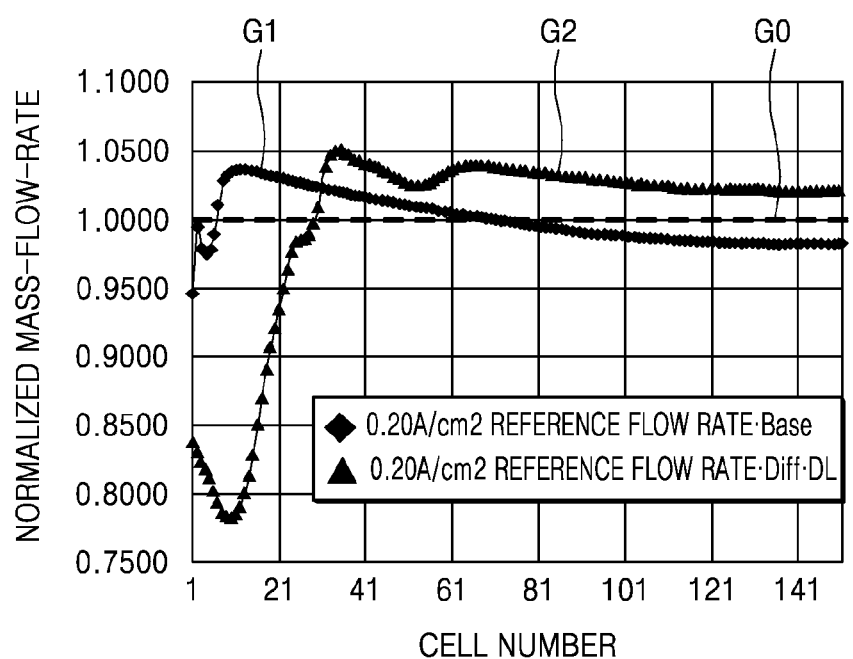
FIG. 19 is a graph showing results of a simulation about flow rate distributions of cells of an embodiment of a fuel cell stack including a fluid tube and a conventional fuel cell stack in which the fluid tube is not included.

FIG. 19 is a graph showing flow rate distributions in cells of an embodiment of a fuel cell stack where a flow velocity equalizer is provided in the fuel cell stack and a conventional fuel cell stack in which the fuel cell stack is not provided. Data shown in FIG. 19 are results of a simulation performed on a fuel cell stack having output power of about 0.6 kilowatt (kW) and 151 cells.

In FIG. 19, a first curve G1 denotes fluid distribution of cells in an embodiment of a fuel cell stack including the flow velocity equalizer, and a second curve G2 denotes fluid distribution of cells of the conventional fuel cell stack in which the flow velocity equalizer is not provided. G0 denotes a reference fluid distribution amount for each cell.

Referring to FIG. 19, in the embodiment of a fuel cell stack including the flow velocity equalizer (G1), the fluid distribution of cells has a maximum deviation of about 9.1% and a standard deviation of about 1.65%. On the other hand, in the conventional fuel cell stack in which the flow velocity equalizer is not provided (G2), the fluid distribution of cells has a maximum deviation of about 26.93% and a standard deviation of about 9.41%.

The results show that the use of the flow velocity equalizer reduces the maximum deviation from about 27% to about 9.1% and the standard deviation from about 9.41% to 1.65%. Since the maximum fluid distribution deviation (flow rate deviation) reduces from about 27% to about 9.1%, as described above, the performance of the fuel cell stack may be improved. When the flow velocity equalizer is not used, due to a fluid distribution deviation, the maximum deviation of output voltages of cells of a stack may be about 10 millivolts (mV), for example. However, when the flow velocity equalizer is used, the maximum deviation of output voltages may be in a range of about 2 mV to about 3 mV.

FIGS. 20A and 20B show fluid flow distributions in the simulation of FIG. 19, showing variations of a flow separation phenomenon in a manifold in the conventional fuel cell stack in which the fluid tube is not included and in the embodiment of the fuel cell stack in which the fluid tube is included, respectively.

Reference numerals 100 and 110 in FIG. 20A and reference numeral 120 in FIG. 20B denote regions in which flow separation phenomena occur.

As shown in FIGS. 20A and 20B, the flow separation regions are substantially reduced in an embodiment of the invention where the flow velocity equalizer is provided.

Figure 21A:
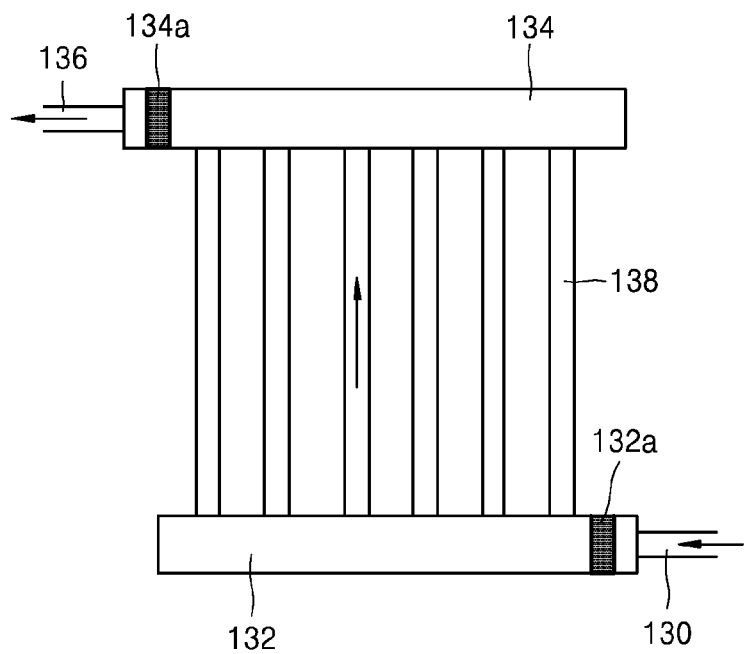
FIGS. 21A to 21C are a front view, a side view, and a plan view of an embodiment of a heat exchanger including the fluid tube of FIG. 1.
Figure 21B:
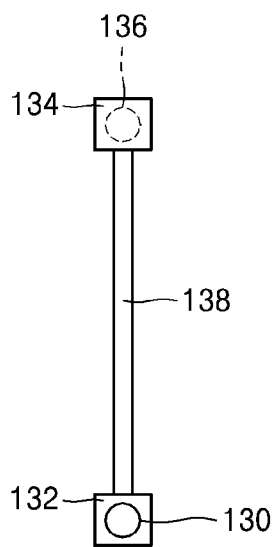
Figure 21C:
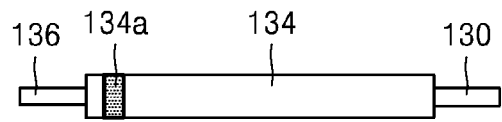

FIGS. 21A to 21C illustrate an embodiment of a heat exchanger including the fluid tube, according the invention. FIGS. 21A, 21B and 21C respectively are a front view, a side view and a plan view of the embodiment of the heat exchanger.

Referring to FIGS. 21A to 21C, the heat exchanger includes an inlet tube (130, 132), an outlet tube (134, 136), and a plurality of connection tubes 138. The inlet tube (130, 132) for introducing fluid includes a first inlet tube 130 and a second inlet tube 132 connected to the first inlet tube 130. The diameter of the first inlet tube 130 may be smaller than that of the second inlet tube 132. The outlet tube (134, 136) includes a first outlet tube 134 and a second outlet tube 136 connected to the first outlet tube 134. The diameter of the second outlet tube 136 may be smaller than that of the first outlet tube 134. The second inlet tube 132 and the first outlet tube 134 may have the same diameter as each other. The second inlet tube 132 and the first outlet tube 134 may be substantially parallel to each other. The second inlet tube 132 and the first outlet tube 134 are connected through the plurality of connection tubes 138. The connection tubes 138 may be substantially parallel to each other. Ends of the connection tubes 138 are connected to the second inlet tube 132, and the other ends of the connection tubes 138 are connected to the first outlet tube 134. The connection tubes 138 may be substantially vertical to the second inlet tube 132 and the first outlet tube 134. The diameters of the connection tubes 138 may be smaller than those of the second inlet tube 132 and the first outlet tube 134. Fluid introduced into the first inlet tube 130 for heat exchange flows in the second inlet tube 132, the connection tubes 138 and the first outlet tube 134, and then is discharged through the second outlet tube 136. The fluid may be a coolant or oil.

In an embodiment, a first flow velocity equalizer 132a is provided in a portion of the first inlet tube 130 connected to the second inlet tube 132. The first flow velocity equalizer 132a may have the same structure as that of the flow velocity equalizer 34 described above with reference to FIGS. 1 to 8.

In such an embodiment, a second flow velocity equalizer 134a may be provided in a portion of the first outlet tube 134 connected to the second outlet tube 136. The second flow velocity equalizer 134a may have the same shape as and disposed in a different direction from the first flow velocity equalizer 132a.

Figure 22A:
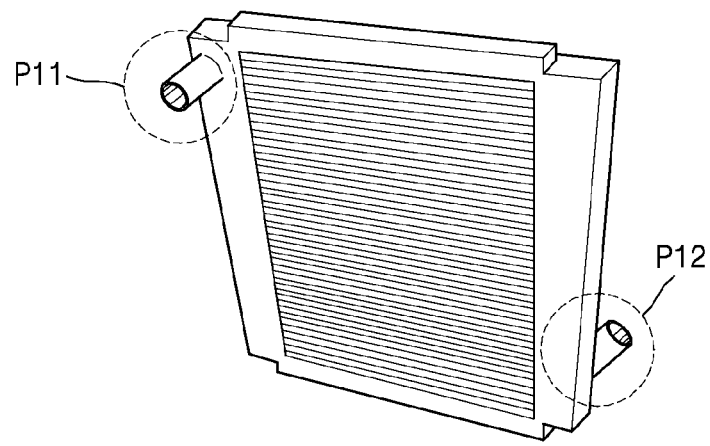
FIGS. 22A and 22B are perspective views illustrating alternative embodiments of the heat exchanger including the fluid tube of FIG. 1.
Figure 22B:
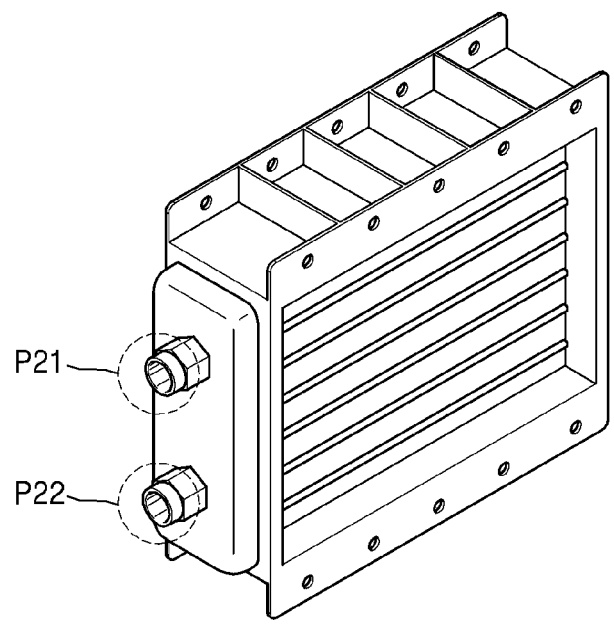

FIGS. 22A and 22B illustrate embodiments of the heat exchanger including fluid tubes, according to the invention.

In an embodiment of the heat exchanger, as shown in FIG. 22A, a fluid inlet P11 and a fluid outlet P12 are disposed at upper and lower sides in a staggered manner. A flow velocity equalizer may be provided in the fluid inlet P11. Any one of the embodiments of the flow velocity equalizer described above with reference to FIGS. 1 to 11 may be used as the flow velocity equalizer directly or after modification based on the inner structure of the fluid inlet P11. A flow velocity equalizer may be provided in the fluid outlet P12, and any one of the embodiments of the flow velocity equalizer described above with reference to FIGS. 1 to 11 may be used (e.g., inserted in a different direction) as the flow velocity equalizer.

The heat exchanger shown in FIG. 22B includes a fluid inlet P21 and a fluid outlet P22 that are disposed at a side thereof. One of the flow velocity equalizers of FIGS. 1 to 11 may be disposed in the fluid inlet P21 after modification based on the inner structure of the fluid inlet P21. A flow velocity equalizer may be disposed in the fluid outlet P22. The flow velocity equalizer provided in the fluid outlet P22 may have the same shape as and disposed in a different direction from the flow velocity equalizer provided in the fluid inlet P21.

Figure 23:
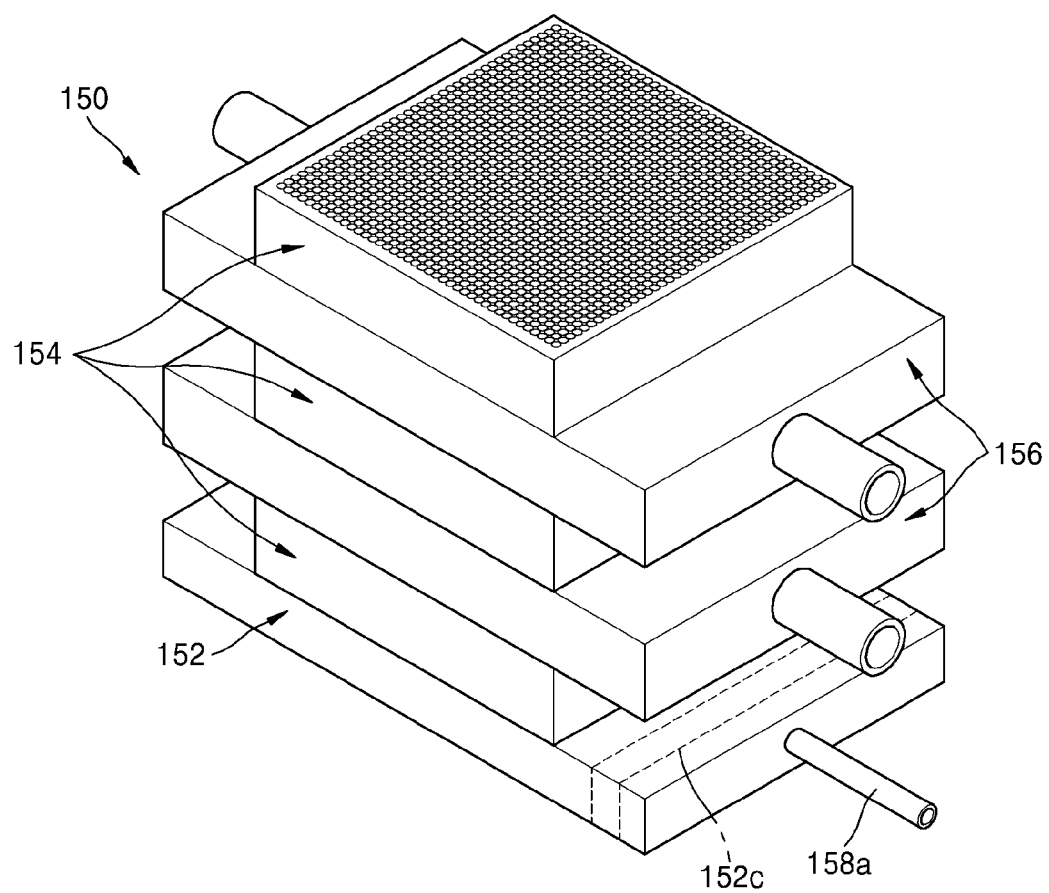
FIG. 23 is a perspective view illustrating an embodiment of a reactor including the fluid tube of FIG. 1.

FIG. 23 illustrates an embodiment of a micro-channel reactor (hereinafter referred to as a reactor 150) as the apparatus including the fluid tube, according to the invention.

Referring to FIG. 23, an embodiment of the reactor 150 includes a gas plenum 152 as a gas distributor. A first inlet 158a is provided on the gas plenum 152. Although not shown in FIG. 23, a second inlet 158b (refer to FIG. 24) is provided on a side of the gas plenum 152 that is opposite to the first inlet 158a. Monoliths 154 and heat exchangers 156 are alternately stacked twice on the gas plenum 152. The monoliths 154 are used to facilitate the function of a catalyst in a liquid-gas reaction. The monoliths 154 include a plurality of micro-channels. The micro-channels may include gas channels and liquid channels. Gas may be supplied to the gas channels through the gas plenum 152. The liquid channels may penetrate the gas plenum 152. Liquid may be supplied to the liquid channel from a liquid supply source (not shown) disposed under the gas plenum 152. A catalyst may be provided in the micro-channels.

FIG. 24A separately illustrates the gas plenum 152 and a monolith 154 adjacent thereto in FIG. 23. FIG. 24B is an enlarged view of a portion of the monolith 154. FIG. 24C is an enlarged view of a contact portion between the monolith 154 and the gas plenum 152.

Referring to FIG. 24A, the first inlet 158a is connected to one end of the gas plenum 152, and the second inlet 158b is connected to another end of the gas plenum 152 that is opposite to the first inlet 158a. The widths of the first and second inlets 158a and 158b may be smaller than the width of the gas plenum 152. The first and second inlets 158a and 158b may correspond to the first fluid tube 30. Portions 152a and 152b connected to the first and second inlets 158a and 158b of the gas plenum 152 may correspond to the second fluid tube 32. The gas plenum 152 may include a first flow velocity equalizer 152c at the portion 152a between the first inlet 158a and the monolith 154. The first flow velocity equalizer 152c may be disposed in the portion 152a. The gas plenum 152 may include a second flow velocity equalizer 152d at the portion 152b between the second inlet 158b and the monolith 154. The first and second flow velocity equalizers 152c and 152d may have the same shape as one of the embodiments of the flow velocity equalizer 34 described above with reference to FIGS. 1 to 8. In FIGS. 24B and 24C, reference numeral 160 denotes gas channels. The gas channels 160 are defined or formed through the monolith 154. Reference numeral 162 denotes liquid channels. The liquid channels 162 are defined or formed through the gas plenum 152 and the monolith 154. The gas channels 160 are close to the liquid channels 162.

Figure 25A:
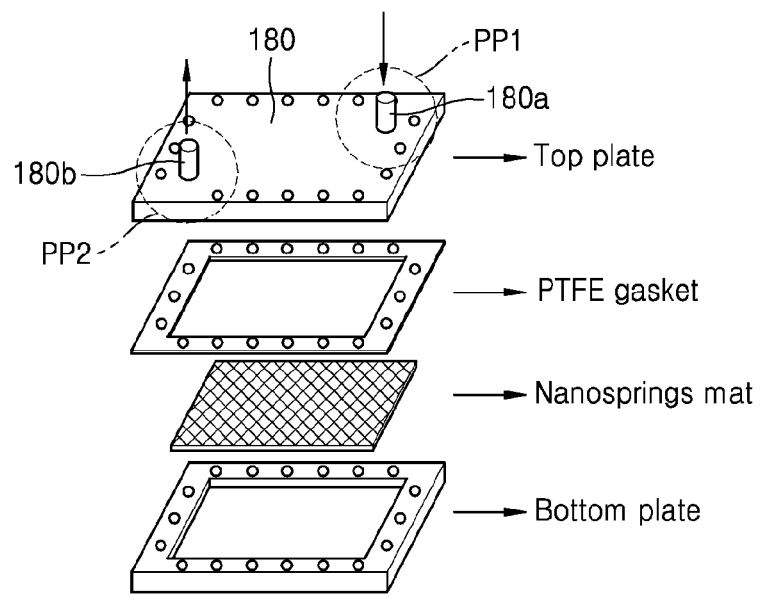
FIGS. 25A to 25C are views illustrating another embodiment of the reactor including the fluid tube of FIG. 1.
Figure 25B:
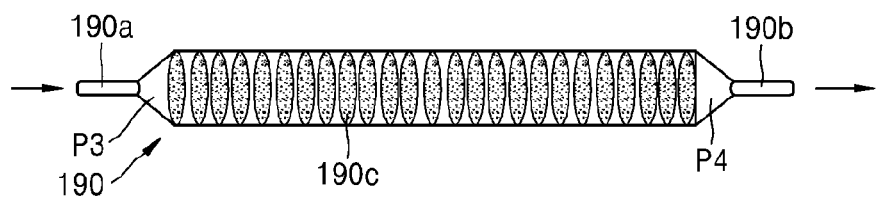
Figure 25C:
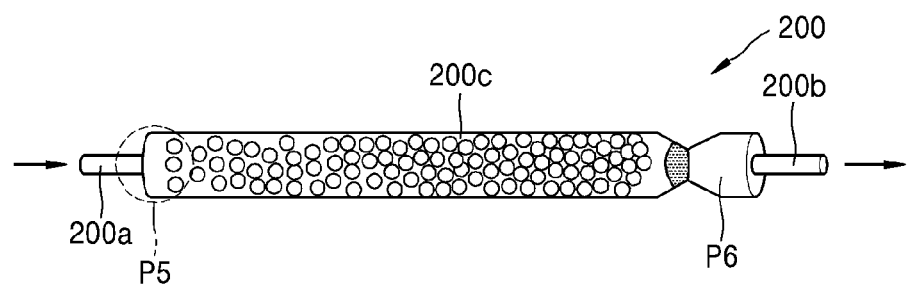

FIGS. 25A to 25C illustrates embodiments of an enzyme reactor as the apparatus including the fluid tube, according to the invention.

FIG. 25A is an exploded perspective view of an embodiment of a single porous plate reactor ("SPPR").

Referring to FIG. 25A, an embodiment of SPPR includes a top plate 180, a polytetrafluoroethylene ("PTFE") gasket, nanosprings mat and a bottom plate. In such an embodiment, a first flow velocity equalizer may be provided in a portion PP1 of the top plate 180 where a fluid inlet 180a is formed. The first flow velocity equalizer may be one of the embodiments of the flow velocity equalizer described above with reference to FIGS. 1 to 11. A second flow velocity equalizer may be provided in a portion PP2 of the top plate 180 where a fluid outlet 180b is formed. The second flow velocity equalizer may have the same shape as and disposed in a different direction from the first flow velocity equalizer.

FIG. 25B illustrates an embodiment of a stacked multi-porous disk flow reactor ("SMPDFR") 190.

Referring to FIG. 25B, an embodiment of the SMPDFR 190 includes a fluid inlet 190a and a fluid outlet 190b. A first flow velocity equalizer may be provided in a portion P3 of a chamber 190c to which the fluid inlet 190a is connected. The flow velocity equalizer may be one of the embodiments of the flow velocity equalizer described above with reference to FIGS. 1 to 11. In an embodiment, the outer shape of the flow velocity equalizer may be modified based on the sectional shape of the chamber 190c. A second flow velocity equalizer may be provided in a portion P4 of the chamber 190c to which the fluid outlet 190b is connected. The second flow velocity equalizer is used to discharge fluid therethrough and may have the same shape as and disposed in a different direction from the first flow velocity equalizer.

FIG. 25C illustrates an embodiment of a micro-fixed bed flow reactor ("MFBFR") 200.

Referring to FIG. 25C, an embodiment of the MFBFR 200 includes a fluid inlet 200a and a fluid outlet 200b. A first flow velocity equalizer may be provided in a portion P5 of a chamber 200c thereof to which the fluid inlet 200a is connected. A second flow velocity equalizer may be provided in a portion P6 of the chamber 200c to which the fluid outlet 200b is connected. The first flow velocity equalizer may be one of the embodiments of the flow velocity equalizer described above with reference to FIGS. 1 to 11. The second flow velocity equalizer may have the same shape as and disposed in a different direction from the first flow velocity equalizer.

It should be understood that the embodiments described therein should be considered in a descriptive sense only and not for purposes of limitation. Descriptions of features or aspects within each embodiment should typically be considered as available for other similar features or aspects in other embodiments.

While one or more embodiments of the invention have been described with reference to the figures, it will be understood by those of ordinary skill in the art that various changes in form and details may be made therein without departing from the spirit and scope of the invention as defined by the following claims.

What is claimed is:

1. A fluid tube comprising:
   a first fluid tube;
   a second fluid tube connected to the first fluid tube; and
   a flow velocity equalizer in the second fluid tube,
   wherein
   the flow velocity equalizer increases a uniformity of fluid flow passed therethrough,
   the second fluid tube is wider than the first fluid tube, and
   the flow velocity equalizer comprises a diverging tube and a converging tube.

2. The fluid tube of claim 1, further comprising:
   a fluid divider between the flow velocity equalizer and the first fluid tube.

3. The fluid tube of claim 1, wherein
   the diverging tube has a width increasing in a fluid flow direction, and
   the converging tube comprises a plurality of converging tubes having widths decreasing in the fluid flow direction.

4. The fluid tube of claim 1, wherein
   the converging tube has a width decreasing in a fluid flow direction, and
   the diverging tube comprises a plurality of diverging tubes having widths increasing in the fluid flow direction.

5. The fluid tube of claim 1, wherein the flow velocity equalizer has substantially the same outer shape as a cross-section of the second fluid tube.

6. The fluid tube of claim 3, wherein a plurality of holes widening in the fluid flow direction is defined in the diverging tube.

7. The fluid tube of claim 4, wherein a plurality of holes narrowing in the fluid flow direction is defined in the converging tube.

8. The fluid tube of claim 6, wherein a density of the plurality of holes is maximum in a center region of the diverging tube and decreased toward an edge region of the diverging tube.

9. The fluid tube of claim 6, wherein the plurality of holes have a slit or rectangular shape.

10. The fluid tube of claim 7, wherein a density of the plurality of holes is maximum in a center region of the converging tube and decreased toward an edge region of the converging tube.

11. The fluid tube of claim 7, wherein the plurality of holes have a slit or rectangular shape.

12. The fluid tube of claim 11, wherein
    the plurality of holes have the slit shape,
    sizes of entrances of the plurality of holes are substantially equal to or different from each other, and
    sizes of exits of the plurality of holes are substantially equal to or different from each other.

13. An apparatus comprising the fluid tube of claim 1 through which fluid is introduced or discharged.

14. The apparatus of claim 13, wherein the fluid tube comprises a manifold of a fuel cell stack.

15. The apparatus of claim 13, wherein the fluid tube comprises a fluid inlet or outlet of a heat exchanger.

16. The apparatus of claim 13, wherein the fluid tube comprises a fluid inlet or outlet of a reactor.

17. The apparatus of claim 14, wherein one of fuel, air and refrigerant is supplied through the manifold.

18. The apparatus of claim 14, wherein one of fuel, air and refrigerant is discharged through the manifold.

19. The apparatus of claim 14, wherein the flow velocity equalizer is provided at one of an end plate, an insulation plate, a current collector and a bipolar plate of the fuel cell stack.

20. The apparatus of claim 19, wherein the flow velocity equalizer is defined by a machined pattern in one of the end plate, the insulation plate, the current collector and the bipolar plate.

* * * * *